Jan. 31, 1950     J. H. F. STEWART     2,495,871
FLUID SEALING DEVICE
Filed Oct. 20, 1945

INVENTOR.
JOHN H. F. STEWART
BY Ralph L. Tweedale
ATTORNEY

Patented Jan. 31, 1950

2,495,871

UNITED STATES PATENT OFFICE 2,495,871

FLUID SEALING DEVICE

John H. F. Stewart, Detroit, Mich.

Application October 20, 1945, Serial No. 623,502

5 Claims. (Cl. 286—1)

This invention relates to devices for sealing moving surfaces against fluid leakage commonly known as oil seals and used, for example, on sliding pistons, piston rods, rotating shafts, and the like. Oil seals of this type are commonly manufactured as a cartridge sub-assembly in which a flexible, resilient sealing ring has a protruding lip which resiliently engages the cylindrical surface to be sealed. This flexible lip of leather, synthetic rubber, or similar material is of a somewhat delicate nature and easily damaged, particularly in the act of initially assembling the seal into operative position with the surface to be sealed.

Furthermore, inexperienced stock room attendants commonly resort to the practice of storing such conventional seals by merely hanging them on nails or studs projecting horizontally from a wall. If the sealing lip is made of synthetic rubber such, for example, as neoprene, such material readily takes a permanent set when distorted by such hanging on a nail or stud, which irreparably damages the sealing capacity of the lip.

Good design practice requires that the end of the shaft, rod or cylinder be provided with an adequate chamfer which will gradually expand or compress the projecting lip without damage as it is being assembled into operative relationship. However, this requirement is overlooked or overruled by other considerations in the majority of installations, and protection of the sealing lip during assembly is then dependent upon the use of special tools or bullets which the mechanic is supposed to use. Since a special bullet is required for each size of seal, it is difficult to insure that mechanics will always use them, particularly on replacement work in the field, and many oil seals are consequently placed in service in an initially damaged condition.

It is an object of the present invention to provide an improved protector for oil seals which may be assembled in operative relationship with the seal when it is manufactured and will protect the seal during storage, handling and installation and may be discarded after the seal is installed.

A further object is to provide an improved oil seal assembly having a disposable, temporary seal protector assembled therewith which will take the place of the special tool or bullet commonly used to guide the sealing lip into operative relationship with the surface to be sealed.

A further object is to provide a seal protector which is automatically ejected from an oil seal by the act of assembling the oil seal into operative position and which, in addition, will fail to be automatically ejected if the seal should be assembled to either an undersize shaft if it is a shaft seal or an oversize bore if it is a bore seal.

Further objects and advantages of the present invention will be apparent from the following description, reference being had to the accompanying drawing wherein a preferred form of the present invention is clearly shown.

Figure 1:
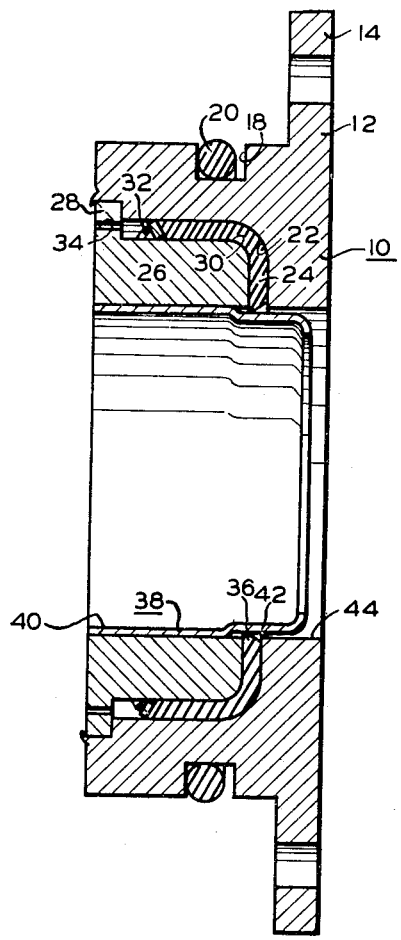
Figure 1 is a cross-sectional view of a shaft seal assembly incorporating a preferred form of the present invention.

Referring now to the drawing, there is shown a seal assembly 10 which may be of any desired construction, and, as illustrated, is similar to that disclosed in the Stewart Patent No. 2,332,763. The seal assembly comprises a main housing 12 having a flange 14 by which the seal may be secured to a part such as 16 (Figure 2) on which the seal is to be mounted. The main body of the housing 12 is cylindrical for insertion in a suitable bore in the part 16 and is provided with a groove 18 for the reception of a suitable stationary sealing ring 20.

The housing 12 is provided with a toroidal-shaped guide surface 22 along which a flexible sealing ring 24 is adapted to slide. An inner retainer member 26 having a flange 28 is staked to the housing 12 and has a complementary toroidal guide surface 30 for the sealing ring 24. Suitable spring-pressed follower means 32 are provided for pressing the sealing ring forwardly along the guide surfaces 22 and 30, and a series of holes 34 are provided for the admission of fluid pressure to the space behind the sealing ring 24.

The ring 24 has a projecting lip 36 which is adapted to engage in sealing contact with a cylindrical surface to be sealed, for example, a shaft. In order to protect this lip from damage in handling or assembly, a thin-walled, cylindrical sleeve 38 is assembled in a bore 44 of the seal 10 to act as a combined protector and assembly bullet. With the type of shaft seal illustrated, the bore 44 may safely be designed with a substantial clearance around the shaft, and the walls of the protector 38 are made thin enough to fit within this clearance space.

Preferably the protector 38 is provided with two portions of different diameters. The lefthand portion 40 has an outer diameter closely fitting but slidable in the bore 44 and an inner diameter closely fitting but slidable over the shaft for which the seal is designed. The righthand portion 42 has an inner diameter too small to fit over the smallest shaft with which the seal can be used and an outer diameter somewhat smaller than the bore 44. The two portions 40 and 42 are joined by a smoothly-contoured shoulder over which the lip 36 can slide to be gradually compressed without damage. Likewise, the righthand end of the sleeve 38 is inwardly flared to provide a smoothly-rounded external contour for ease in assembling the protector 38 into the projecting lip 36.

Figure 2:
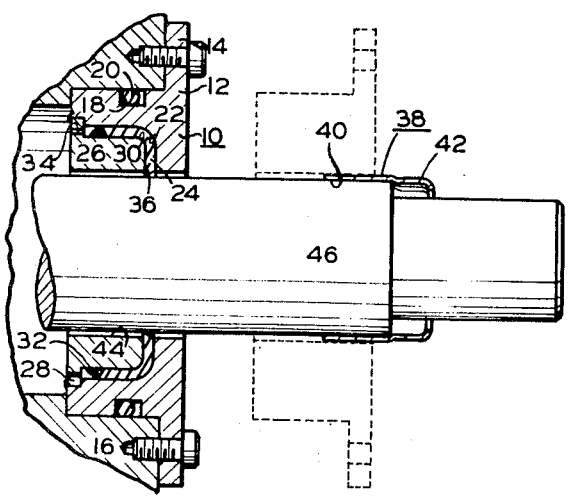
Figure 2 is a view corresponding to Figure 1 showing the shaft seal in assembled position on a shaft and indicating in dotted lines the position of the parts during one stage of assembly.

When it is desired to install the oil seal and protector sub-assembly illustrated in Figure 1 into operative relationship on a shaft such as illustrated at 46 in Figure 2, it will be seen that the sub-assembly may be placed over the end of the shaft and that the parts will remain in the position illustrated in Figure 1 until the lefthand portion 40 of the protector 38 has been fully telescoped over the sealing diameter of the shaft 46. The shoulder between portions 40 and 42 prevents further leftward movement of the protector 38, and, as the oil seal is pushed further to the left, into the dotted line position, the projecting lip 36 is expanded to pass over the portion 40. As the lip 36 passes off the left end of the protector 38, it will again expand into contact with the shaft and be slid along the same without damage. The protector 38 may then be removed from the shaft and discarded.

It will be seen that the protector 38 avoids damage to the delicate sealing lip, not only during storage and in handling but also when it is assembled over the sharp shoulder of the shaft 46. It also serves to prevent undue projection of the lip 36 under the action of the spring-pressed follower 32 and serves to center the housing 12 around the shaft 46 during assembly.

It will also be noted that, when the protector 38 is in the position illustrated in Figure 2, the righthand portion 42 extends axially from the large end of the shaft, and, since the central opening in the protector is of substantially greater diameter than the outer reduced diameter end of the shaft, the protector may be readily removed from the shaft by insertion of a suitable tool in the clearance therebetween or otherwise.

The protector 38 may be manufactured at low cost from drawn or extruded metal or from cardboard, molded plastic, or other readily available material. It also serves to protect the working parts of the seal from dirt and, when it is automatically removed in the act of assembly of the oil seal, serves to wipe the length of the bore 44 clean.

While the form of embodiment of the invention as herein disclosed constitutes a preferred form, it is to be understood that other forms might be adopted, all coming within the scope of the claims which follow.

What is claimed is as follows:

1. A shaft seal cartridge comprising a fluid seal of the type having both rigid and flexible annular parts, the rigid part of which has only a small clearance with the mating part which is to be sealed, and a protector comprising a rigid sleeve having a smoothly-rounded end portion adapted to gradually compress the flexible part of the fluid seal when being assembled therewith and having its largest outside diameter no greater than the smallest inside diameter of the rigid part of the fluid seal, the protector having one tubular portion with internal and external diameters capable of telescoping between the rigid part and the mating part and having another portion with internal and external diameters differing from those of the one tubular portion such that the flexible part when resting on the other portion of the protector prior to use may project at least to its normal position of use, and means forming a tapered merging surface between said portions whereby the flexible part may be compressed without damage during installation of the seal and removal of the protector.

2. A shaft seal cartridge comprising a fluid seal of the type having both rigid and flexible annular parts, the rigid part of which has only a small clearance with the mating part which is to be sealed, and a protector comprising a rigid sleeve having a smoothly-rounded end portion adapted to gradually compress the flexible part of the fluid seal when being assembled therewith and having its largest outside diameter no greater than the smallest inside diameter of the rigid part of fluid seal, said sleeve consisting of two cylindrical portions, each of slightly different diameter from the other, joined by a smoothly tapered shoulder portion, one cylindrical portion having inner and outer diameters to fit between the seal and the mating part and the other cylindrical portion having an inside diameter smaller than the outside diameter of the mating part.

3. A shaft seal cartridge comprising a shaft seal having a rigid annular housing and an inwardly-projecting, flexible sealing lip, and a seal protector comprising a disposable, rigid sleeve telescopically fitted in the housing to cover the lip, said sleeve having, throughout one portion of its length, an inner diameter as great as that of any shaft with which the fluid seal is designed to be used and an outer diameter smaller than the inner diameter of the housing, and, in another portion an inner diameter smaller than the shaft diameter, and an outer diameter no greater than the shaft diameter.

4. A shaft seal comprising a fluid seal of the type having both rigid and flexible annular parts, the rigid part of which has only a small clearance with the mating part which is to be sealed, and a protector comprising a rigid sleeve having a smoothly-rounded end portion adapted to gradually compress the flexible part of the fluid seal when being assembled therewith and having an outside diameter no greater that the inside diameter of the rigid part of the fluid seal, the protector having one tubular portion with internal and external diameters capable of telescoping between the rigid part and the mating part and having another portion with internal and external diameters differing from those of the one tubular portion such that the flexible part when resting on the other portion of the protector prior to use may project at least to its normal position of use, and means forming a tapered merging surface between said portions whereby the flexible part may be compressed without damage during installation of the seal and removal of the protector, said smoothly rounded end portion lying at the end opposite said one tubular portion whereby the protector is movable in one direction for insertion and may be removed by a further movement in the same direction.

5. A shaft seal comprising a fluid seal of the type having both rigid and flexible annular parts, the rigid part of which has only a small clearance with the mating part which is to be sealed, and a protector comprising a rigid sleeve having a smoothly-rounded end portion adapted to gradually compress the flexible part of the fluid seal when being assembled therewith and having an outside diameter no greater than the inside diameter of the rigid part of the fluid seal, said smoothly rounded end portion lying at the end opposite the portion fitting between the rigid part and the mating part whereby the protector is insertable by movement in one direction and removable by further movement in the same direction.

JOHN H. F. STEWART.

REFERENCES CITED

The following references are of record in the file of this patent:

UNITED STATES PATENTS

| Number | Name | Date |
| --- | --- | --- |
| 1,346,722 | Rimailho | July 13, 1920 |
| 2,037,046 | Robertson | Apr. 14, 1936 |
| 2,266,175 | Delaval-Crow | Dec. 16, 1941 |
| 2,405,120 | Evans | Aug. 6, 1946 |